US012722391B2

(12) United States Patent
Akiyoshi

(10) Patent No.: US 12,722,391 B2
(45) Date of Patent: Sep. 1, 2026

(54) INK SUPPLIER

(71) Applicant: SCREEN Holdings Co., Ltd., Kyoto (JP)

(72) Inventor: Yasunori Akiyoshi, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 159 days.

(21) Appl. No.: 18/891,148

(22) Filed: Sep. 20, 2024

(65) Prior Publication Data

US 2025/0100293 A1 Mar. 27, 2025

(30) Foreign Application Priority Data

Sep. 22, 2023 (JP) ................................ 2023-158485

(51) Int. Cl.
*B41J 2/18* (2006.01)
*B41J 2/175* (2006.01)

(52) U.S. Cl.
CPC ............ *B41J 2/18* (2013.01); *B41J 2/17596* (2013.01)

(58) Field of Classification Search
CPC ........... B41J 2/18; B41J 2/17596; B41J 2/175
USPC ............................................................. 347/6
See application file for complete search history.

(56) References Cited

U.S. PATENT DOCUMENTS

2019/0100024 A1* 4/2019 Yamada .................. B41J 2/165
2021/0086520 A1* 3/2021 Suyama ..................... B41J 2/18
2023/0302813 A1* 9/2023 Yasuda ....................... B41J 2/01
2023/0347657 A1* 11/2023 Hayashi .................. B41J 29/38

FOREIGN PATENT DOCUMENTS

JP 2021-045932 A 3/2021

* cited by examiner

*Primary Examiner* — Jason S Uhlenhake
*Assistant Examiner* — Alexander D Shenderov
(74) *Attorney, Agent, or Firm* — Rimon P.C.

(57) ABSTRACT

An ink supplier includes a supply reservoir and a recovery reservoir that are connected to a plurality of heads. If abnormality is detected at one of a first and a second pressure regulator that supply negative pressures to the supply reservoir and the recovery reservoir respectively, a controller performs a) cutting off the pressure regulator on the abnormal side and the reservoir from each other; b) opening a bypass valve interposed in a bypass pipe forming communication between an air layer in the supply reservoir and an air layer in the recovery reservoir; c) regulating a negative pressure supplied from the pressure regulator on the normal side to a third negative pressure between a first negative pressure supplied from the first pressure regulator in ordinary time and a second negative pressure supplied from the second pressure regulator in the ordinary time; and d) maintaining the third negative pressure.

3 Claims, 10 Drawing Sheets

● ORDINARY STATE

SNP: STRONG NEGATIVE PRESSURE
MNP: MIDDLE NEGATIVE PRESSURE
WNP: WEAK NEGATIVE PRESSURE

● AFTER DETECTION OF ABNORMALITY
PRESSURE BEING REGULATED

SNP: STRONG NEGATIVE PRESSURE
MNP: MIDDLE NEGATIVE PRESSURE
WNP: WEAK NEGATIVE PRESSURE

● AFTER DETECTION OF ABNORMALITY
AT COMPLETION OF PRESSURE REGULATION

SNP: STRONG NEGATIVE PRESSURE
MNP: MIDDLE NEGATIVE PRESSURE
WNP: WEAK NEGATIVE PRESSURE

- CIRCULATE INK ONLY ALONG SMALL CIRCULATION ROUTE
- GENERATE HEAD DIFFERENCE

SNP: STRONG NEGATIVE PRESSURE
MNP: MIDDLE NEGATIVE PRESSURE
WNP: WEAK NEGATIVE PRESSURE

- CIRCULATE INK ONLY ALONG SMALL CIRCULATION ROUTE
- AFTER DETECTION OF ABNORMALITY

SNP: STRONG NEGATIVE PRESSURE
MNP: MIDDLE NEGATIVE PRESSURE
WNP: WEAK NEGATIVE PRESSURE

● CIRCULATE INK
ALONG LARGE AND SMALL CIRCULATION ROUTES

SNP: STRONG NEGATIVE PRESSURE
MNP: MIDDLE NEGATIVE PRESSURE
WNP: WEAK NEGATIVE PRESSURE

INK SUPPLIER

RELATED APPLICATIONS

This application claims the benefit of Japanese Application No. 2023-158485, filed on Sep. 22, 2023, the disclosure of which is incorporated by reference herein.

BACKGROUND OF THE INVENTION

Field of the Invention

The present invention relates to an ink supplier that supplies ink to a plurality of heads in an ink-jet printing apparatus.

Description of the Background Art

Some type of ink used in an ink-jet printing apparatus causes a precipitate easily as a result of agglomeration of a component in the ink. For example, ink of a watercolor pigment type to agglomerate easily is used as ink for flexible packaging.

In the ink-jet printing apparatus, the ink touches outside air at a nozzle provided at a head. Hence, at a nozzle not used for printing, agglomeration is caused easily as a result of evaporation of a solvent. In response to this, a circulation system of supplying the ink to the head and recovering the ink from the head is employed, thereby reducing remaining of the ink in the head to suppress agglomeration in the nozzle. A printing apparatus employing the circulation system is described in Japanese Patent Application Laid-Open No. 2021-45932, for example.

The printing apparatus described in Japanese Patent Application Laid-Open No. 2021-45932 has an ink supplier with ink storages including a feed reservoir (91*f*) arranged upstream from a head (H) and a return reservoir (91*r*) arranged downstream from the head as well as a main reservoir (91*m*) as a source of ink. A feed-side regulating part (98*f*) of a pressure regulation mechanism (98) applies a negative pressure to the feed reservoir (91*f*) and a return-side regulating part (98*r*) of the pressure regulation mechanism (98) applies a negative pressure to the return reservoir (91*r*).

By causing the pressure regulation mechanism (98) to apply a stronger negative pressure to the return reservoir (91*r*) than that applied to the feed reservoir (91*f*), a pressure difference is generated to generate a flow of the ink from the feed reservoir (91*f*) toward the return reservoir (91*r*) via the head (H). In this way, the flow of the ink is generated in the head by taking advantage of a difference in negative pressure between the reservoirs arranged upstream and downstream from the head, thereby suppressing agglomeration in the head.

In such a mechanism, on the occurrence of abnormality at one of the two pressure regulation mechanisms to apply negative pressures to the corresponding two reservoirs arranged upstream and downstream from the head, what has conventionally been done is to bring both the two pressure regulation mechanisms into a state of being cut off from the reservoirs during a period from a moment immediately after detection of the abnormality and in which a worker to conduct maintenance work arrives and then the maintenance work is completed.

As a result of such a conventional way of operation, it may become impossible to maintain a negative pressure in the head, failing to maintain a meniscus. Hence, leakage of the ink may be caused. Furthermore, in the state where both the two pressure regulation mechanisms are cut off from the reservoirs, it is difficult to generate a flow of the ink in the head by circulating the ink. This causes a risk of agglomeration in the head if a long time is required to complete the maintenance work.

SUMMARY OF THE INVENTION

The present invention has been made in view of the foregoing circumstances, and is intended to provide a technique of suppressing agglomeration in a head while reducing the occurrence of leakage of ink from a nozzle on the occurrence of abnormality at a pressure regulation mechanism.

To solve the above-described problem, a first aspect of the present invention is intended for an ink supplier that supplies ink to a head in an ink-jet printing apparatus, comprising: a supply reservoir storing the ink to be supplied to the head; a recovery reservoir storing the ink recovered from the head; an inter-reservoir ink flow path for feeding the ink from the recovery reservoir to the supply reservoir; a first pressure regulator that supplies a negative pressure to the supply reservoir; a first communication pipe forming communication between the first pressure regulator and an air layer in the supply reservoir; a first valve interposed in the first communication pipe; a second pressure regulator that supplies a negative pressure to the recovery reservoir; a second communication pipe forming communication between the second pressure regulator and an air layer in the recovery reservoir; a second valve interposed in the second communication pipe; a bypass pipe forming communication between the air layer in the supply reservoir and the air layer in the recovery reservoir; a bypass valve interposed in the bypass pipe; a detector that detects abnormality at the first pressure regulator and the second pressure regulator; and a controller that controls operations of the first pressure regulator, the first valve, the second pressure regulator, the second valve, and the bypass valve. In an ordinary operating state, the controller opens the first valve and the second valve and closes the bypass valve, the controller causes the first pressure regulator to supply a first negative pressure to the supply reservoir, the controller causes the second pressure regulator to supply a second negative pressure stronger than the first negative pressure to the recovery reservoir, and if the detector detects abnormality at one of the first pressure regulator and the second pressure regulator, the controller performs the steps of: a) an abnormal side cutoff step of closing a valve being one of the first valve and the second valve and corresponding to one of the pressure regulators where the abnormality has been detected by the detector; b) a bypass opening step of opening the bypass valve after the step a); c) a pressure changing step of regulating a negative pressure supplied from the other of the first pressure regulator and the second pressure regulator where the detector has not detected abnormality to a third negative pressure stronger than the first negative pressure and weaker than the second negative pressure, the step c) being performed after the step a); and d) an ink circulating step of generating a flow of the ink by which the ink flows from the supply reservoir toward the recovery reservoir via a plurality of the heads while maintaining the negative pressure supplied from the other pressure regulator at the third negative pressure, the step d) being performed after the step c).

According to a second aspect of the present invention, the ink supplier according to the first aspect further comprises an inter-reservoir pump interposed in the inter-reservoir ink flow path and used for feeding the ink from the recovery reservoir toward the supply reservoir. The step d) performed by the controller includes the steps of: d1) a head difference generating step of driving the inter-reservoir pump to feed the ink from the recovery reservoir to the supply reservoir via the inter-reservoir ink flow path so as to make a liquid surface of the ink in the supply reservoir become higher than a liquid surface of the ink in the recovery reservoir; and d2) a standby step of stopping the inter-reservoir pump and going into standby waiting for the ink to move from the supply reservoir to the recovery reservoir via the plurality of heads as a result of a head difference to reduce a difference in liquid surface height between the supply reservoir and the recovery reservoir, the step d2) being performed after the step d1).

According to a third aspect of the present invention, the ink supplier according to the first aspect further comprises: a tank storing the ink to be supplied to the supply reservoir; an ink supply path forming communication between the tank and the supply reservoir; a supply pump interposed in the ink supply path and used for feeding the ink from the tank toward the supply reservoir; an ink recovery path forming communication between the recovery reservoir and the tank; a recovery pump interposed in the ink recovery path and used for feeding the ink from the recovery reservoir toward the tank; and an inter-reservoir pump interposed in the inter-reservoir ink flow path and used for feeding the ink from the recovery reservoir toward the supply reservoir. In the step d), the controller operates the supply pump and the recovery pump at the same feed amount or feed amounts approximate to each other, and operates the inter-reservoir pump at a feed amount smaller than those of the supply pump and the recovery pump.

According to the first to third aspects of the present invention, it is possible to reduce the occurrence of leakage of the ink from the nozzle on the occurrence of abnormality at the pressure regulation mechanism.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
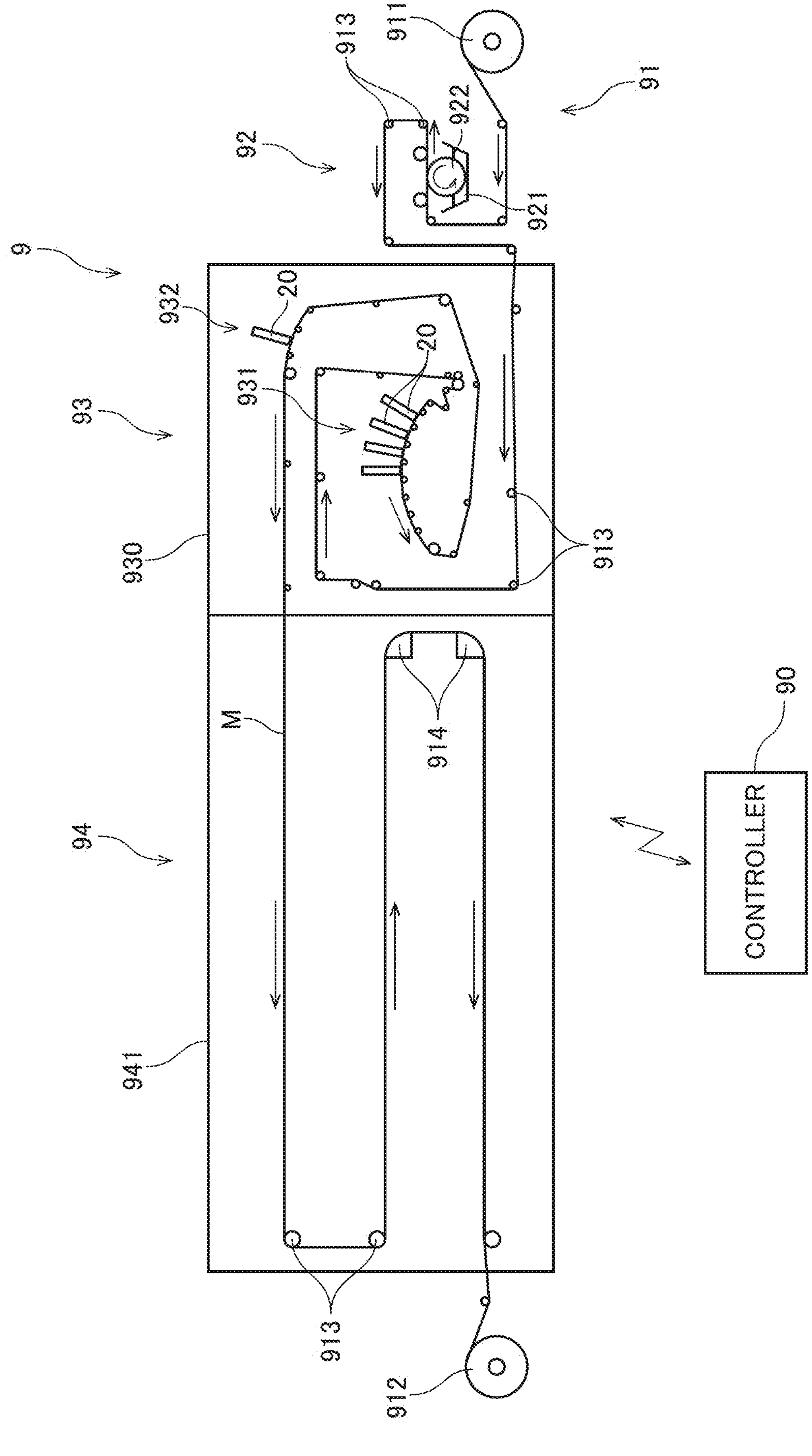
FIG. 1 is a schematic view of a printing apparatus.

A preferred embodiment of the present invention will be described below by referring to the drawings.

<1. Configuration of Printing Apparatus>

A printing apparatus 9 including an ink supplier 1 according to one preferred embodiment of the present invention will be described below by referring to FIG. 1. FIG. 1 is a schematic view of the printing apparatus 9. The printing apparatus 9 performs a coating process, a printing process, and a drying process on an elongated strip-shaped printing medium M while conveying the printing medium M by causing a controller 90 to control each part of the apparatus.

More specifically, the printing apparatus 9 is a printing apparatus that ejects ink of a watercolor pigment type in an ink-jet method to an elongated strip-shaped film sheet for flexible packaging. The printing medium M is composed of a film made of orientated polypropylene (OPP) or polyethylene terephthalate (PET), for example. However, the material of the printing medium M is not limited to a resin film but may be a different material such as paper. Of two surfaces of the printing medium M, a surface on which an image is to be printed is called a front surface and a surface on the opposite side to the front surface is called a back surface.

The printing apparatus 9 includes a conveyance mechanism 91, a coating processor 92, a printing processor 93, and a drying processor 94.

The conveyance mechanism 91 is a mechanism for conveying the printing medium M along a predetermined conveyance path. The conveyance mechanism 91 includes a feed roller 911, a take-up roller 912, and a large number of other conveyance rollers 913. The feed roller 911, the take-up roller 912, and some of the conveyance rollers 913 are rotating rollers that are caused to rotate by a motor, for example. Some of the other conveyance rollers 913 are driven rollers that are caused to rotate in response to the motion of the printing medium M.

When the printing apparatus 9 is driven, the feed roller 911, the take-up roller 912, and the rotating rollers as some of the conveyance rollers 913 rotate to feed the printing medium M from the feed roller 911. After the printing medium M is subjected to the coating process by the coating processor 92, the printing process by the printing processor 93, and the drying process by the drying processor 94, the printing medium M is taken-up by the take-up roller 912. In FIG. 1, arrows representing a conveyance direction are given to the front surface side of the printing medium M.

The coating processor 92 is a unit for coating the front surface of the printing medium M with a liquid primer (coating liquid). The coating processor 92 includes a pan 921 and gravure roller 922. The pan 921 stores the liquid primer. The gravure roller 922 is a roller for coating the front surface of the printing medium M conveyed by the conveyance mechanism 91 with the primer. The gravure roller 922 is arranged in such a manner as to be partially dipped in the primer stored in the pan 921.

The gravure roller 922 rotates relative to the printing medium M conveyed with the front surface placed on a lower side while holding the primer on an outer peripheral surface of the gravure roller 922, thereby coating the front surface of the printing medium M with the primer. In FIG. 1, a direction of rotation of the gravure roller 922 is represented by an arrow. A direction of travel of the printing medium M and the direction of rotation of the gravure roller 922 are opposite to each other. Specifically, the gravure roller 922 coats the front surface of the printing medium M with the primer in a so-called reverse kiss method.

The printing processor 93 includes a housing 930, a color printing unit 931, and a white printing unit 932. The color printing unit 931 and the white printing unit 932 are arranged in the housing 930. The color printing unit 931 ejects inks of a plurality of colors from above to the printing medium M conveyed with the front surface placed on an upper side. In the present preferred embodiment, the color printing unit 931 has four head units 20 from which inks of respective colors are ejected. The inks ejected at the color printing unit 931 are inks of cyan, magenta, yellow, and black, for example. The white printing unit 932 ejects a white ink from above to the printing medium M conveyed with the front surface placed on an upper side. The white printing unit 932 has one head unit 20 from which an ink of white is ejected.

A detailed configuration of the head unit 20 and that of the ink supplier 1 for supplying ink to a plurality of heads 21 of the head unit 20 will be described later.

The printing processor 93 further includes a preliminary drying unit (not shown in the drawings) provided downstream from the color printing unit 931 and upstream from the white printing unit 932, and a preliminary drying unit (not shown in the drawings) provided downstream from the white printing unit 932. These drying units are used for drying ink ejected to the front surface of the printing medium M.

The drying processor 94 is a unit for drying the ink ejected to the front surface of the printing medium M at the printing processor 93. The drying processor 94 includes a drying furnace 941 as a housing. In the drying furnace 941, the conveyance mechanism 91 forms an S-shape conveyance path for the printing medium M. Instead of the conveyance roller 913, the conveyance mechanism 91 includes air turn bars 914 provided at positions to touch the front surface of the printing medium M in the drying furnace 941.

The controller 90 is configured using a computer including a processor such as a CPU, a memory such as a RAM, and a storage part such as a hard disk drive, for example. The processor of the controller 90 controls the operations of the conveyance mechanism 91, the coating processor 92, the printing processor 93, and the drying processor 94 described above, and the operation of each part of the ink supplier 1 described later according to a computer program. By doing so, the printing process proceeds in the printing apparatus 9.

<2. Configuration of Ink Supplier>

Figure 2:
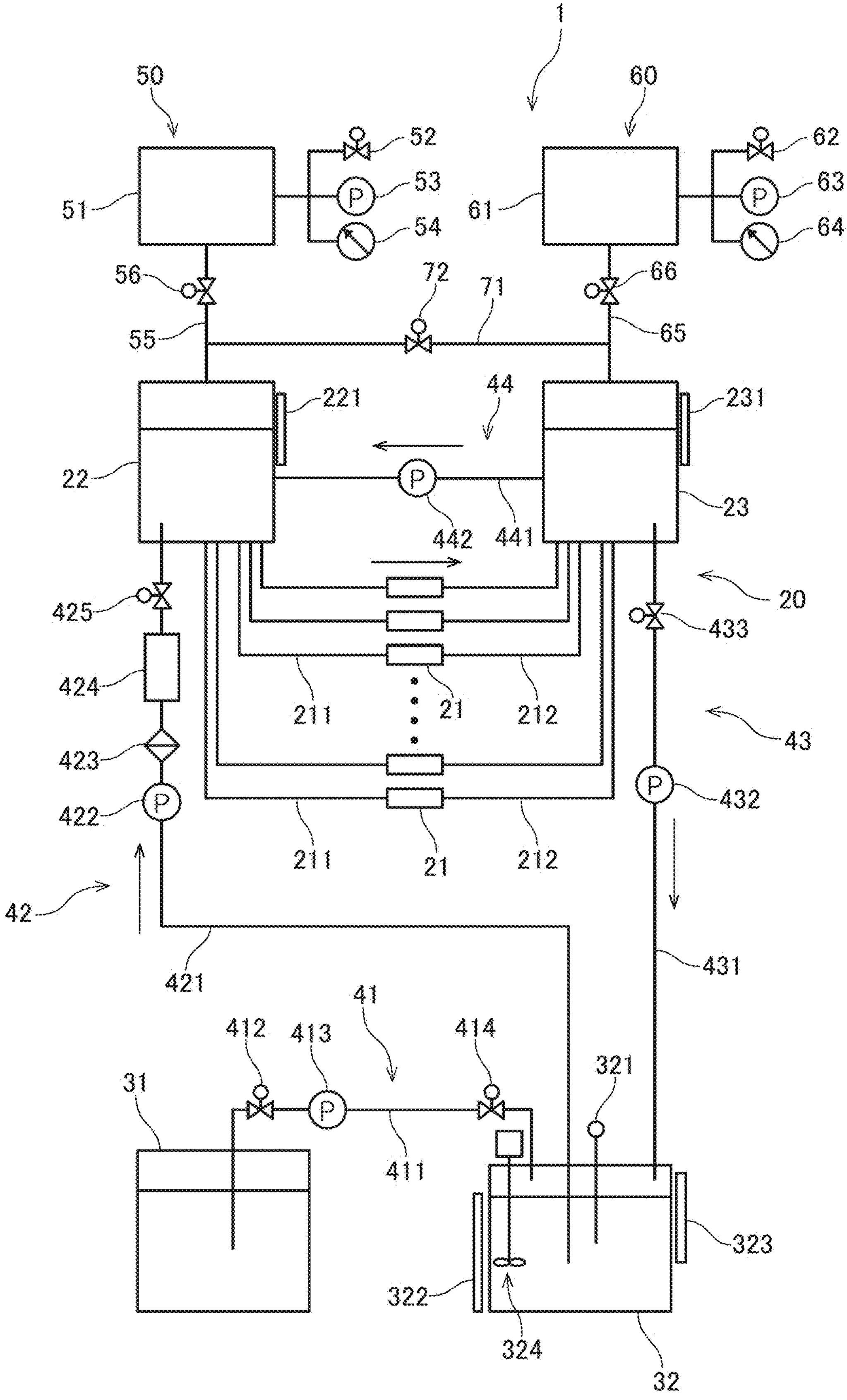
FIG. 2 is a schematic view of an ink supplier.

The configuration of the ink supplier 1 for supplying ink to the plurality of heads 21 of the head unit 20 will be described next by referring to FIG. 2. One ink supplier 1 is provided in response to each of the head units 20 including the four head units 20 belonging to the color printing unit 931 and one head unit 20 belonging to the white printing unit 932. Specifically, the printing apparatus 9 includes five ink suppliers 1. These ink suppliers 1 have the same configuration.

The head unit 20 includes the plurality of heads 21 aligned in a horizontal direction. In FIG. 1, a direction perpendicular to the plane of paper corresponds to the horizontal direction. A supply reservoir 22 and a recovery reservoir 23 are provided in the head unit 20.

The ink supplier 1 includes the supply reservoir 22 and the recovery reservoir 23, a drum tank 31, and a buffer tank 32 that function as storages of the ink. The ink supplier 1 includes a first transport unit 41, a second transport unit 42, a third transport unit 43, and a fourth transport unit 44 that function as means of transporting the ink between corresponding storages.

The head unit 20 includes the plurality of heads 21, the supply reservoir 22, and the recovery reservoir 23. Each of the heads 21 has a plurality of ejection nozzles provided at a surface of the bottom of the head 21 for ejecting the ink to the printing medium M.

The supply reservoir 22 is an ink storage storing the ink to be supplied to the head 21. The supply reservoir 22 has a bottom to which one ends of a plurality of supply pipes 211 are communicably connected. The other ends of these supply pipes 211 are connected to the respective heads 21 differing from each other. By doing so, the supply reservoir 22 becomes communicably connected via the supply pipes 211 to the heads 21.

The supply reservoir 22 includes a first level sensor 221. A detection signal from the first level sensor 221 allows the controller 90 to determine the amount of the ink stored in the supply reservoir 22. The first level sensor 221 may be a floating level sensor or a level sensor of a different type such as an electrode type, a vibration type, or an optical type, for example.

In the supply reservoir 22, the amount of the ink stored therein is adjusted in such a manner as to form an air layer having a certain volume or more at the top of the supply reservoir 22. The air layer in the supply reservoir 22 is connected to a first pressure regulator 50.

The first pressure regulator 50 is a mechanism for supplying a negative pressure to the supply reservoir 22. The first pressure regulator 50 includes a first air tank 51, a first atmospheric relief valve 52 for releasing internal space in the first air tank 51 to the atmosphere, a first vacuum pump 53 for bringing the internal space in the first air tank 51 to a negative pressure, and a first pressure gage 54 for measuring an internal pressure in the first air tank 51.

The first air tank 51 and the air layer in the supply reservoir 22 are communicably connected to each other via a first communication pipe 55. Specifically, the first communication pipe 55 forms communication between the first pressure regulator 50 and the air layer in the supply reservoir 22. A first valve 56 is interposed in the first communication pipe 55. The first valve 56 is a solenoid valve for opening and closing the first communication pipe 55.

In order to reduce a pressure in the first air tank 51, the first vacuum pump 53 is driven while the first atmospheric relief valve 52 is kept closed. In order to increase a pressure in the first air tank 51, the first atmospheric relief valve 52 is opened. A pressure in the first air tank 51 is detected by the first pressure gage 54.

By opening the first valve 56 while maintaining a pressure in the first air tank 51 at a predetermined "first negative pressure" at the first pressure regulator 50, a pressure in the supply reservoir 22 is maintained at the first negative pressure.

The recovery reservoir 23 is an ink storage storing the ink recovered from the head 21. The recovery reservoir 23 has a bottom to which one ends of a plurality of recovery pipes 212 are communicably connected. The other ends of these recovery pipes 212 are connected to the respective heads 21 differing from each other. By doing so, the recovery reservoir 23 becomes communicably connected via the recovery pipes 212 to the heads 21.

The recovery reservoir 23 includes a second level sensor 231. A detection signal from the second level sensor 231 allows the controller 90 to determine the amount of the ink stored in the recovery reservoir 23. The second level sensor 231 may be a floating level sensor or a level sensor of a different type such as an electrode type, a vibration type, or an optical type, for example.

In the recovery reservoir 23, the amount of the ink stored therein is adjusted in such a manner as to form an air layer having a certain volume or more at the top of the recovery reservoir 23. The air layer in the recovery reservoir 23 is connected to a second pressure regulator 60.

The second pressure regulator 60 is a mechanism for supplying a negative pressure to the recovery reservoir 23. The second pressure regulator 60 includes a second air tank 61, a second atmospheric relief valve 62 for releasing internal space in the second air tank 61 to the atmosphere, a second vacuum pump 63 for bringing the internal space in the second air tank 61 to a negative pressure, and a second pressure gage 64 for measuring an internal pressure in the second air tank 61.

The second air tank 61 and the air layer in the recovery reservoir 23 are communicably connected to each other via a second communication pipe 65. Specifically, the second communication pipe 65 forms communication between the second pressure regulator 60 and the air layer in the recovery reservoir 23. A second valve 66 is interposed in the second communication pipe 65. The second valve 66 is a solenoid valve for opening and closing the second communication pipe 65.

In order to reduce a pressure in the second air tank 61, the second vacuum pump 63 is driven while the second atmospheric relief valve 62 is kept closed. In order to increase a pressure in the second air tank 61, the second atmospheric relief valve 62 is opened. A pressure in the second air tank 61 is detected by the second pressure gage 64.

By opening the second valve 66 while maintaining a pressure in the second air tank 61 at a predetermined "second negative pressure" at the second pressure regulator 60, a pressure in the recovery reservoir 23 is maintained at the second negative pressure.

The second negative pressure is a negative pressure stronger than the first negative pressure. Specifically, the second negative pressure is a pressure lower than the first negative pressure. The second negative pressure has an absolute value larger than the absolute value of the first negative pressure. This makes a difference between atmospheric pressure and the second negative pressure larger than a difference between atmospheric pressure and the first negative pressure. Thus, a pressure in the recovery reservoir 23 becomes smaller than a pressure in the supply reservoir 22, thereby generating a flow of the ink from the supply reservoir 22 toward the recovery reservoir 23 via the plurality of heads 21.

The drum tank 31 is an ink storage having a maximum capacity for ink storage. The ink is supplied from the drum tank 31 to the supply reservoir 22 and the recovery reservoir 23 in the head unit 20 via the buffer tank 32.

The buffer tank 32 is a tank for temporarily storing the ink to be supplied to the supply reservoir 22. The buffer tank 32 has a capacity for ink storage less than that of the drum tank 31 and greater than those of the supply reservoir 22 and the recovery reservoir 23. The drum tank 31 and the buffer tank 32 are arranged in areas separate from the head unit 20.

The buffer tank 32 is provided with a temperature sensor 321, a heater 322, a level sensor 323, and an agitating unit 324.

The temperature sensor 321 detects the temperature of the ink stored in the buffer tank 32. The heater 322 is attached to an outer wall of the buffer tank 32 and heats the ink in the buffer tank 32. The controller 90 controls the heater 322 on the basis of the temperature of the ink detected by the temperature sensor 321.

The level sensor 323 detects the height of the ink stored in the buffer tank 32, and outputs result of the detection to the controller 90. The agitating unit 324 agitates the ink stored in the buffer tank 32 to prevent non-uniformity of heating and non-uniformity of concentration.

The first transport unit 41 transports the ink from the drum tank 31 to the buffer tank 32. The first transport unit 41 includes a pipe 411, and a valve 412, a pump 413, and a valve 414 interposed in the pipe 411. The pipe 411 has one end placed in an ink storage region in the drum tank 31. The pipe 411 has the other end communicating with the inside of the buffer tank 32.

The valves 412 and 414 are opened and the pump 413 is actuated by the controller 90, thereby feeding the ink stored in the drum tank 31 to the buffer tank 32 via the pipe 411.

The second transport unit 42 transports the ink from the buffer tank 32 to the supply reservoir 22. The second transport unit 42 includes an ink supply path 421, and a supply pump 422, a filter 423, a degassing unit 424, and a supply valve 425 interposed in the ink supply path 421.

The ink supply path 421 forms communication between the buffer tank 32 and the supply reservoir 22. The ink supply path 421 has one end placed in an ink storage region in the buffer tank 32. The ink supply path 421 has the other end communicating with the inside of the supply reservoir 22. The supply pump 422 feeds the ink from the buffer tank 32 toward the supply reservoir 22.

The filter 423 removes a solid component from the ink. The solid component in the ink is an agglomeration or a precipitate, for example. The degassing unit 424 removes air bubbles from the ink or part of a gas component dissolving in the ink. The supply valve 425 is a solenoid valve for opening and closing the ink supply path 421. The supply valve 425 is opened and the supply pump 422 is actuated by the controller 90, thereby feeding the ink stored in the buffer tank 32 to the supply reservoir 22 via the ink supply path 421.

The third transport unit 43 transports the ink from the recovery reservoir 23 to the buffer tank 32. The third transport unit 43 includes an ink recovery path 431, and a recovery pump 432 and a recovery valve 433 interposed in the ink recovery path 431.

The ink recovery path 431 forms communication between the recovery reservoir 23 and the buffer tank 32. The ink recovery path 431 has one end placed in an ink storage region in the recovery reservoir 23. The ink recovery path 431 has the other end communicating with the inside of the buffer tank 32. The recovery pump 432 feeds the ink from the recovery reservoir 23 toward the buffer tank 32. The recovery valve 433 is a solenoid valve for opening and closing the ink recovery path 431.

The recovery valve 433 is opened and the recovery pump 432 is actuated by the controller 90, thereby feeding the ink stored in the recovery reservoir 23 to the buffer tank 32 via the ink recovery path 431.

The fourth transport unit 44 transports the ink from the recovery reservoir 23 to the supply reservoir 22. The fourth transport unit 44 includes an inter-reservoir ink flow path 441, and an inter-reservoir pump 442 interposed in the inter-reservoir ink flow path 441.

The inter-reservoir ink flow path 441 forms communication between the supply reservoir 22 and the recovery reservoir 23. The inter-reservoir ink flow path 441 has one end placed in the ink storage region in the recovery reservoir 23. The inter-reservoir ink flow path 441 has the other end placed in the ink storage region in the supply reservoir 22.

The inter-reservoir pump 442 is interposed in the inter-reservoir ink flow path 441, and feeds the ink from the recovery reservoir 23 toward the supply reservoir 22. The inter-reservoir pump 442 is actuated by the controller 90, thereby feeding the ink stored in the recovery reservoir 23 to the supply reservoir 22 via the inter-reservoir ink flow path 441.

The ink supplier 1 includes a bypass pipe 71 forming communication between the first communication pipe 55 and the second communication pipe 65, and a bypass valve 72 interposed in the bypass pipe 71.

The bypass pipe 71 has one end communicably connected to the first communication pipe 55 at a position closer to the supply reservoir 22 than the first valve 56. The bypass pipe 71 has the other end communicably connected to the second communication pipe 65 at a position closer to the recovery reservoir 23 than the second valve 66. By doing so, the bypass pipe 71 forms communicable connection between the air layer in the supply reservoir 22 and the air layer in the recovery reservoir 23 indirectly via a part of the first communication pipe 55 and a part of the second communication pipe 65.

The bypass valve 72 is a solenoid valve for forming and cutting off the communication via the bypass pipe 71. Thus, opening the bypass valve 72 forms communication between the air layer in the supply reservoir 22 and the air layer in the recovery reservoir 23. Furthermore, closing the bypass valve 72 cuts off the air layer in the supply reservoir 22 and the air layer in the recovery reservoir 23 from each other. In an ordinary state, the bypass valve 72 is closed for making a difference in pressure between the supply reservoir 22 and the recovery reservoir 23.

With this configuration, two ink circulation routes including a small circulation route 11 and a large circulation route 12 are formed in the ink supplier 1.

The small circulation route 11 is configured using the supply reservoir 22, a plurality of groups each composed of the supply pipe 211, the head 21 and the recovery pipe 212, the recovery reservoir 23, and the fourth transport unit 44.

To circulate the ink along the small circulation route 11, a pressure difference between the supply reservoir 22 and the recovery reservoir 23 is generated by the first pressure regulator 50 and the second pressure regulator 60, and the inter-reservoir pump 442 of the fourth transport unit 44 is driven. Then, by the presence of the pressure difference between the supply reservoir 22 and the recovery reservoir 23, a flow of the ink is generated by which the ink flows from the supply reservoir 22 toward the recovery reservoir 23 via the supply pipe 211, the head 21, and the recovery pipe 212 corresponding to each other. Furthermore, by driving the inter-reservoir pump 442, a flow of the ink is generated by which the ink flows from the recovery reservoir 23 toward the supply reservoir 22 via the inter-reservoir ink flow path 441.

The large circulation route 12 is configured using the buffer tank 32, the second transport unit 42, the supply reservoir 22, a plurality of groups each composed of the supply pipe 211, the head 21 and the recovery pipe 212, the recovery reservoir 23, and the third transport unit 43.

To circulate the ink along the large circulation route 12, the supply valve 425 is opened and the supply pump 422 is driven at the second transport unit 42, the recovery valve 433 is opened and the recovery pump 432 is driven at the third transport unit 43, and a pressure difference between the supply reservoir 22 and the recovery reservoir 23 is generated by the first pressure regulator 50 and the second pressure regulator 60.

Then, by driving the supply pump 422, a flow of the ink is generated by which the ink flows from the buffer tank 32 toward the supply reservoir 22 via the ink supply path 421. Furthermore, by the presence of the pressure difference between the supply reservoir 22 and the recovery reservoir 23, a flow of the ink is generated by which the ink flows from the supply reservoir 22 toward the recovery reservoir 23 via the supply pipe 211, the head 21, and the recovery pipe 212 corresponding to each other. Furthermore, by driving the recovery pump 432, a flow of the ink is generated by which the ink flows from the recovery reservoir 23 toward the buffer tank 32 via the ink recovery path 431.

In order to reduce the occurrence of agglomeration of the ink in the head 21 even in a standby period waiting for printing, in a printing step, or in a maintenance step on the head 21, the controller 90 controls each part so as to always generate a flow of the ink in the head 21. More specifically, the controller 90 conducts circulation of the ink along the small circulation route 11, circulation of the ink along the large circulation route 12, or both of these circulations.

At this time, the controller 90 adjusts a feed amount at each of the supply pump 422, the recovery pump 432, and the inter-reservoir pump 442 in order for each of a liquid surface level of the ink in the supply reservoir 22 detected by the level sensor 221 and a liquid surface level of the ink in the recovery reservoir 23 detected by the level sensor 231 to fall within a predetermined range. Specifically, if the liquid surface level in the supply reservoir 22 detected by the level sensor 221 becomes equal to or less than a predetermined level, the supply pump 422 is driven to supplement the supply reservoir 22 with the ink. If the liquid surface level in the recovery reservoir 23 detected by the level sensor 231 becomes equal to or greater than a predetermined level, the recovery pump 432 or the inter-reservoir pump 442 is driven in response to the amount of the ink stored at this moment in the supply reservoir 22 to discharge the ink from the recovery reservoir 23 into the buffer tank 32 or the supply reservoir 22.

If the ink is ejected from the head 21 to reduce the ink in the supply reservoir 22 in the printing step or in the maintenance step on the head 21, the ink liquid surface in the supply reservoir 22 is lowered. In this case, a detection signal from the level sensor 221 causes the controller 90 to recognize the reduction in the liquid surface level in the supply reservoir 22. Then, the controller 90 increases a feed amount at the supply pump 422, for example, thereby making adjustment so as to raise the ink liquid surface in the supply reservoir 22 to make this ink liquid surface fall within the predetermined range.

If the ink is supplied from the buffer tank 32 to the head unit 20 to reduce the ink in the buffer tank 32, an ink liquid surface in the buffer tank 32 is lowered. In his case, a detection signal from the level sensor 323 causes the controller 90 to recognize the reduction in the liquid surface level in the buffer tank 32. Then, the controller 90 transports the ink using the first transport unit 41 so as to make the liquid surface level detected by the level sensor 323 fall within a predetermined range.

<3. Ink Circulation Maintaining Method Responsive to Detection of Abnormality at Pressure Regulator>

By referring to FIGS. 3 to 10, the following shows a method of maintaining ink circulation along the ink circulation route including the head 21 responsive to detection of abnormality at the first pressure regulator 50 or the second pressure regulator 60.

The controller 90 detects abnormality at the first pressure regulator 50 and the second pressure regulator 60 using a pressure value measured by each of the first pressure gage 54 of the first pressure regulator 50 and the second pressure gage 64 of the second pressure regulator 60. Specifically, the first pressure gage 54 and the second pressure gage 64 are detectors that detect abnormality at the first pressure regulator 50 and the second pressure regulator 60 respectively.

If the pressure value measured by the first pressure gage 54 exceeds a predetermined pressure range, the controller 90 determines that there is abnormality at the first pressure regulator 50. If the pressure value measured by the second pressure gage 64 exceeds a predetermined pressure range, the controller 90 determines that there is abnormality at the second pressure regulator 60.

Figure 3:
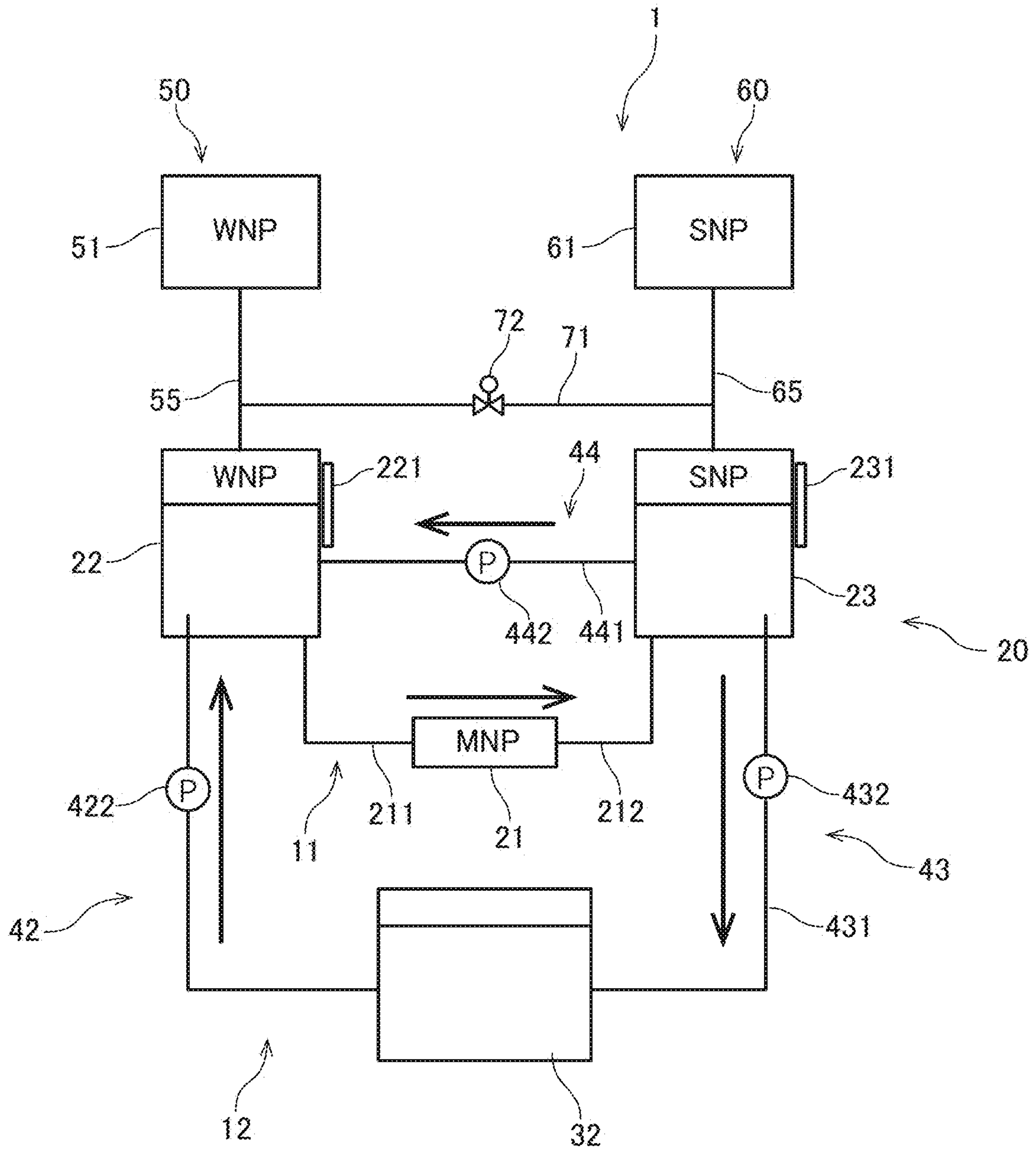
FIG. 3 is a simplified view showing a flow of ink along a small circulation route and a large circulation route in an ordinary state.
Figure 4:
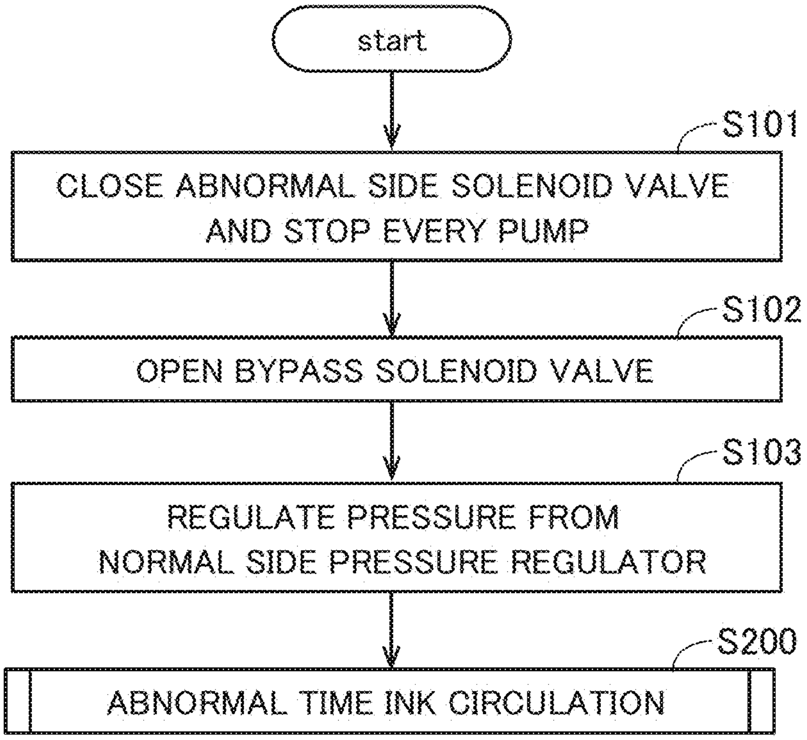
FIG. 4 is a flowchart showing a flow of an ink circulation maintaining process responsive to detection of abnormality at a first pressure regulator or a second pressure regulator.

FIG. 3 is a simplified view showing a flow of the ink along the small circulation route 11 and the large circulation route 12 in the ordinary state. In FIG. 3 and FIGS. 5, 6, and 8 to 10 referred to later, the first valve 56, the second valve 66, the bypass valve 72, the supply valve 425, and the recovery valve 433 are not illustrated when these valves are opened. Furthermore, only one representative head 21 of the plurality of heads 21 is illustrated. FIG. 4 is a flowchart showing a flow of an ink circulation maintaining process responsive to detection of abnormality at the first pressure regulator 50 or the second pressure regulator 60.

As shown in FIG. 3, in the ordinary state, the bypass valve 72 is closed to cut off the air layer in the supply reservoir 22 and the air layer in the recovery reservoir 23 from each other. A pressure in the supply reservoir 22 is kept at the first negative pressure (weak negative pressure) and a pressure in the recovery reservoir 23 is kept at the second negative pressure (strong negative pressure). By doing so, a flow of the ink is generated in the head 21 arranged between the supply reservoir 22 and the recovery reservoir 23, and a pressure in the head 21 is kept at a middle negative pressure stronger than the first negative pressure (weak negative pressure) and weaker than the second negative pressure (strong negative pressure). Meanwhile, the supply pump 422, the recovery pump 432, and the inter-reservoir pump 442 are actuated with timing responsive to respective ink levels in the supply reservoir 22 and the recovery reservoir 23 to circulate the ink along both the small circulation route 11 and the large circulation route 12.

As shown in FIG. 4, when abnormality is detected at the first pressure regulator 50 or the second pressure regulator 60, the controller 90 first closes the valve 56, 66 belonging to the pressure regulator 50, 60 where the abnormality has been detected (step S101: abnormal side cutoff step). More specifically, if abnormality at the first pressure regulator 50 is detected, the controller 90 closes the first valve 56 belonging to the first pressure regulator 50. If abnormality at the second pressure regulator 60 is detected, the controller 90 closes the second valve 66 belonging to the second pressure regulator 60.

In step S101, the controller 90 stops every operating pump simultaneously. Specifically, the supply pump 422, the recovery pump 432, and the inter-reservoir pump 442 having been actuated in the ordinary state are stopped. Furthermore, the supply valve 425 and the recovery valve 433 are closed.

When step S101 is finished, the controller 90 opens the bypass valve 72 (step S102: bypass opening step). Simultaneously with start of step S102 or subsequent to step S102, the controller 90 regulates a negative pressure to a third negative pressure that is supplied from the pressure regulator 50, 60 on a normal side where abnormality has not been detected (step S103: pressure changing step). More specifically, if abnormality at the first pressure regulator 50 is detected, the controller 90 regulates a negative pressure supplied from the second pressure regulator 60 to the third negative pressure. If abnormality at the second pressure regulator 60 is detected, the controller 90 regulates a negative pressure supplied from the first pressure regulator 50 to the third negative pressure. The third negative pressure is a middle negative pressure that is stronger than the first negative pressure (weak negative pressure) and weaker than the second negative pressure (strong negative pressure).

Figure 5:
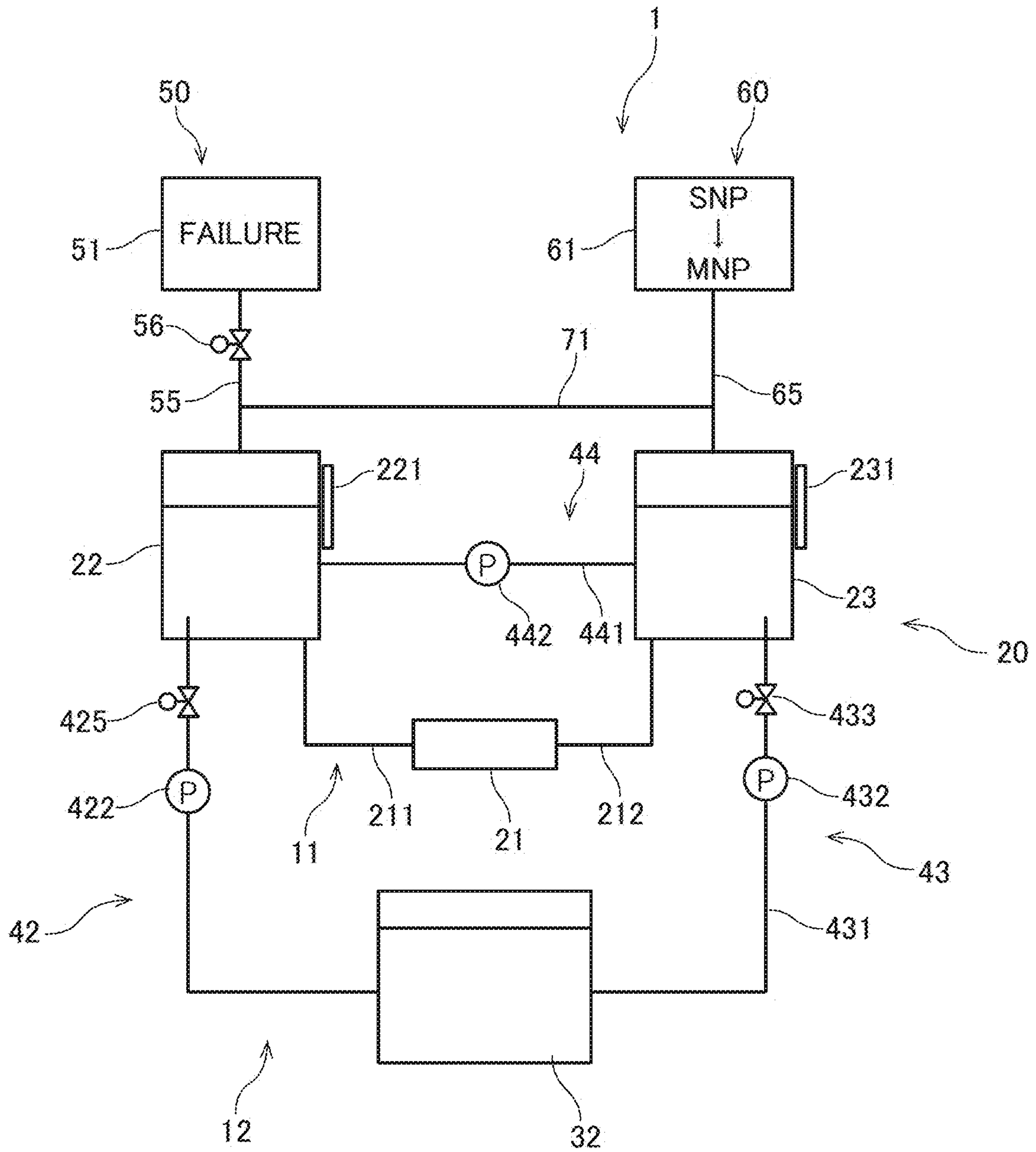
FIG. 5 is a simplified view showing a flow of the ink along the small circulation route and the large circulation route at the beginning of step S103 on the occurrence of abnormality at the first pressure regulator.
Figure 6:
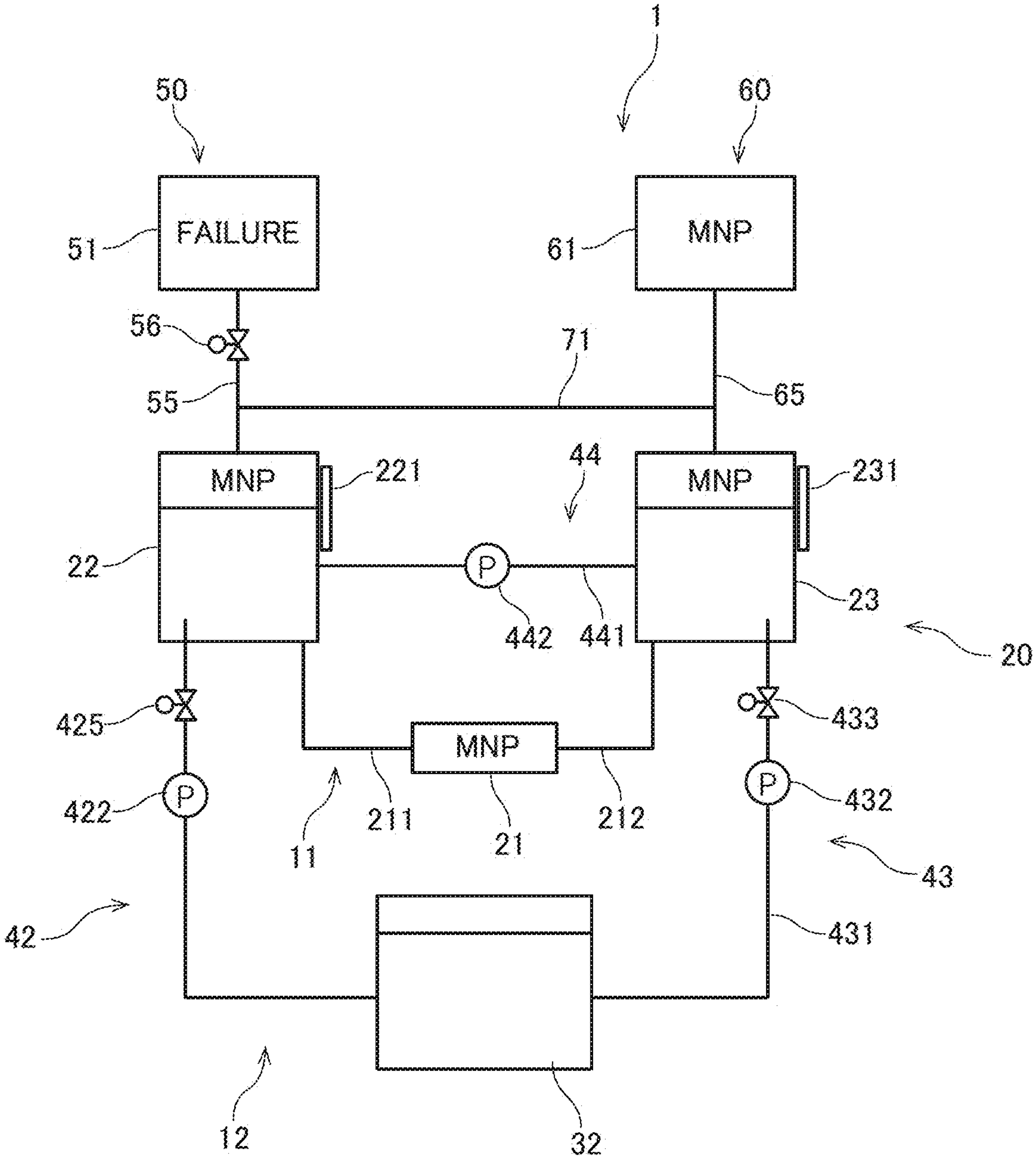
FIG. 6 is a simplified view showing a flow of the ink along the small circulation route and the large circulation route at the completion of step S103 on the occurrence of the abnormality at the first pressure regulator.

FIG. 5 is a simplified view showing a flow of the ink along the small circulation route 11 and the large circulation route 12 at the beginning of step S103 on the occurrence of abnormality at the first pressure regulator 50. FIG. 6 is a simplified view showing a flow of the ink along the small circulation route 11 and the large circulation route 12 at the completion of step S103 on the occurrence of the abnormality at the first pressure regulator 50.

As shown in FIG. 5, at the start of step S103, the bypass valve 72 is opened so the supply reservoir 22 and the recovery reservoir 23 are at the same pressure, and a flow of the ink is stopped. In this state, the negative pressure supplied from the second pressure regulator 60 is changed from the second negative pressure (strong negative pressure) to the third negative pressure (middle negative pressure). By doing so, at the completion of step S103, both pressures in the supply reservoir 22 and the recovery reservoir 23 become the third negative pressure (middle negative pressure), and a pressure in the head 21 communicating with the supply reservoir 22 and the recovery reservoir 23 also becomes the third negative pressure (middle negative pressure) (see FIG. 6).

Thus, the pressure in the head 21 at the completion of step S103 becomes a pressure approximate to a pressure in the head 21 in the ordinary state. As a result, a meniscus is retained at the nozzle of the head 21 to reduce the occurrence of leakage of the ink from the nozzle.

After completion of step S103, the controller 90 maintains the negative pressure at the third negative pressure that is supplied from the pressure regulator 50, 60 on the normal side where abnormality has not been detected. Furthermore, the controller 90 performs an abnormal time ink circulating step (step S200) of generating a flow of the ink by which the ink flows from the supply reservoir 22 toward the recovery reservoir 23 via the plurality of heads 21.

The following shows an abnormal time ink circulating step using only the small circulation route 11 and an abnormal time ink circulating step using the small circulation route 11 and the large circulation route 12 as examples of the abnormal time ink circulating step (step S200).

Figure 7:
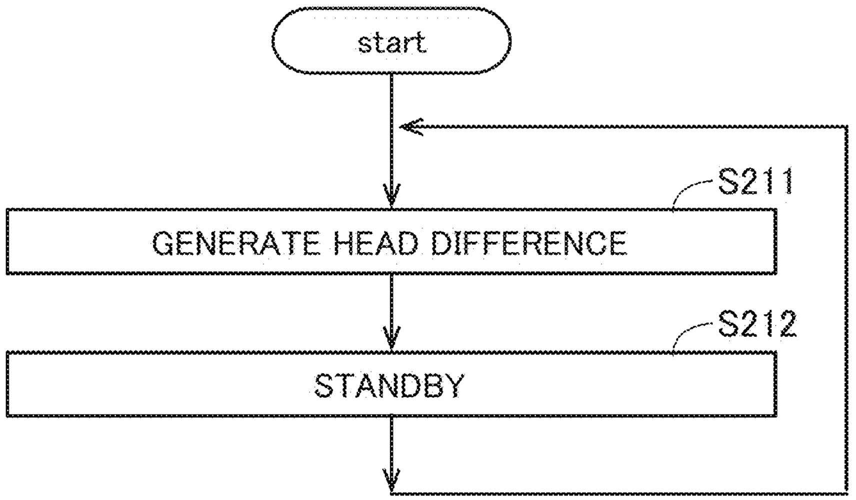
FIG. 7 is a flowchart showing a flow of an abnormal time ink circulating step using only the small circulation route.
Figure 8:
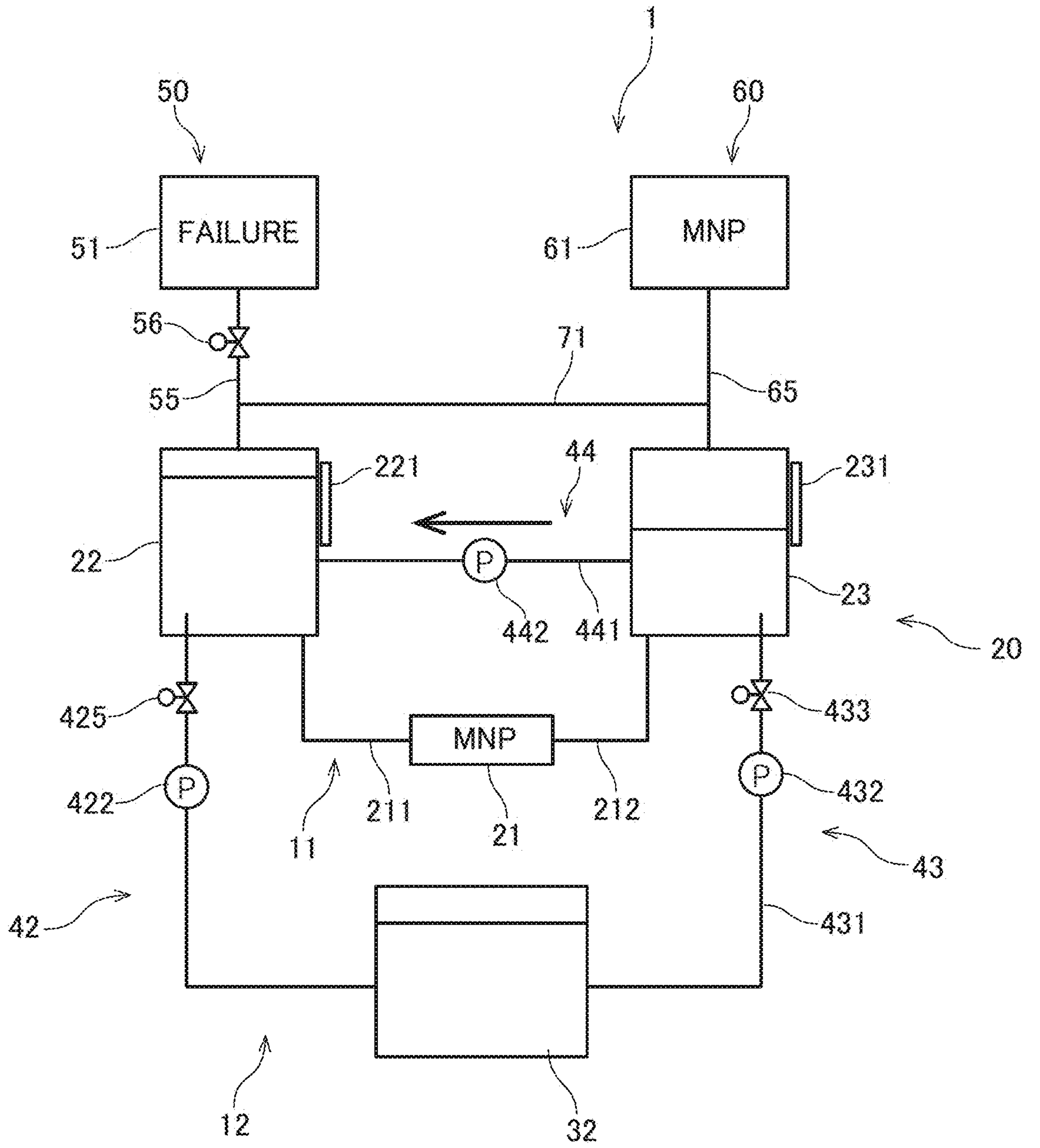
FIG. 8 is a simplified view showing a flow of the ink along the small circulation route and the large circulation route in a head difference generating step (step S211)
Figure 9:
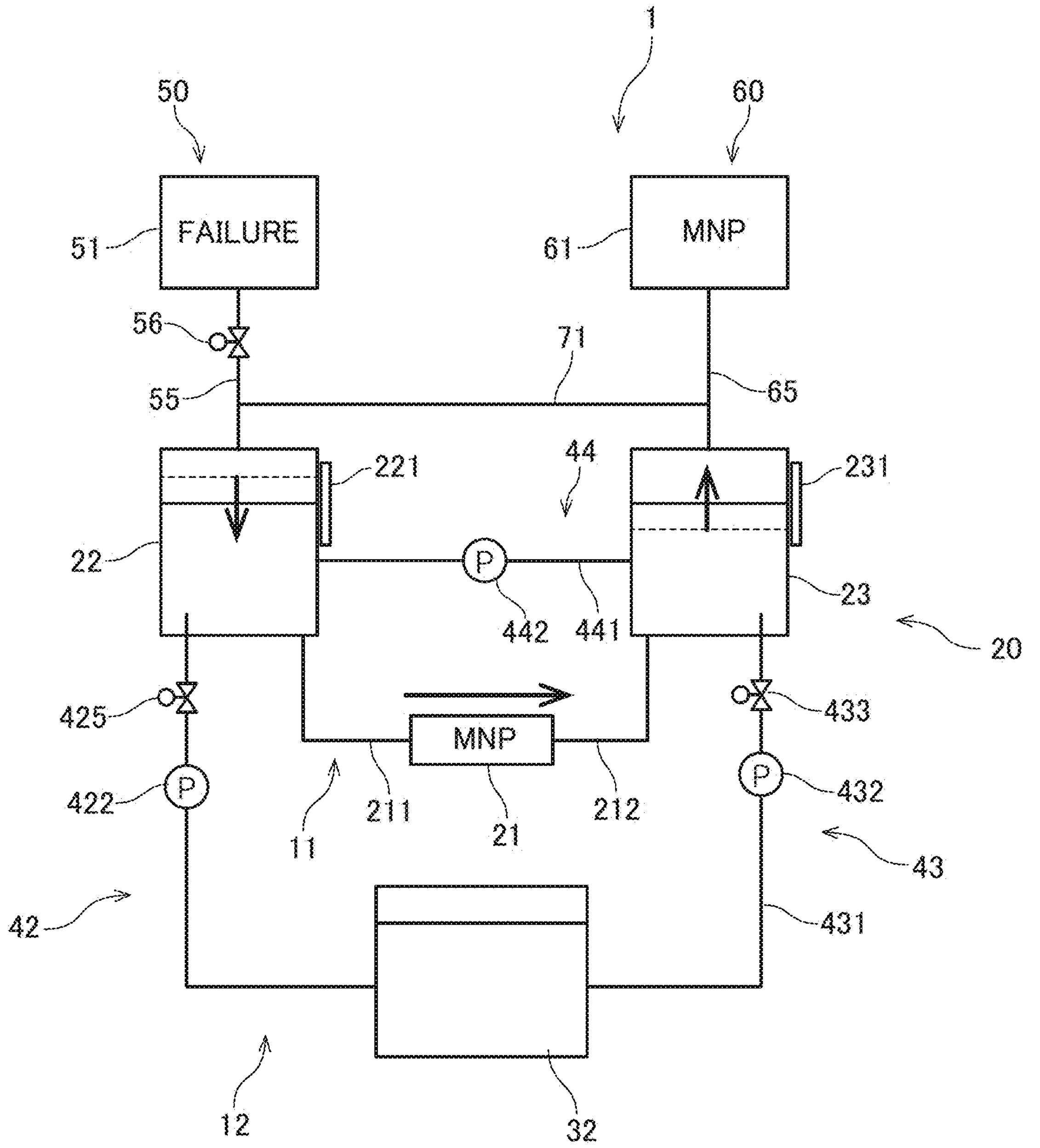
FIG. 9 is a simplified view showing a flow of the ink along the small circulation route and the large circulation route in a standby step (step S212)

FIG. 7 is a flowchart showing a flow of the abnormal time ink circulating step (step S200) using only the small circulation route 11. As shown in FIG. 7, in the abnormal time ink circulating step using only the small circulation route 11, the controller 90 performs a head difference generating step (step S211) and a standby step (step S212) repeatedly. FIG. 8 is a simplified view showing a flow of the ink along the small circulation route 11 and the large circulation route 12 in the head difference generating step (step S211). FIG. 9 is a simplified view showing a flow of the ink along the small circulation route 11 and the large circulation route 12 in the standby step (step S212).

In the head difference generating step (step S211), the controller 90 drives the inter-reservoir pump 442 to feed the ink from the recovery reservoir 23 to the supply reservoir 22 via the inter-reservoir ink flow path 441 so as to make the liquid surface of the ink in the supply reservoir 22 become higher than the liquid surface of the ink in the recovery reservoir 23. By doing so, a head difference is generated between the supply reservoir 22 and the recovery reservoir 23, as shown in FIG. 8. If the controller 90 judges on the basis of measured values from the level sensors 221 and 231 that the head difference of a predetermined degree is generated, the controller 90 finishes the head difference generating step (step S211).

Next, in the standby step (step S212), the controller 90 stops the inter-reservoir pump 442 and goes into standby waiting for the ink to move from the supply reservoir 22 to the recovery reservoir 23 via the plurality of heads 21 as a result of the head difference to reduce a difference in liquid surface height between the supply reservoir 22 and the recovery reservoir 23. By doing so, the head difference between the supply reservoir 22 and the recovery reservoir 23 is reduced, as shown in FIG. 9. If the controller 90 judges on the basis of measured values from the level sensors 221 and 231 that the head difference becomes equal to or less than a predetermined threshold, the controller 90 finishes the standby step (step S212) and returns to the head difference generating step (step S211).

By employing this method, a head difference is generated between the supply reservoir 22 and the recovery reservoir 23 to circulate the ink along the small circulation route 11. Furthermore, while a back pressure is ensured for the nozzle of the head 21 to reduce the occurrence of leakage of the ink from the nozzle, it is possible to suppress agglomeration of the ink in the head 21 by generating a flow of the ink in the head 21.

As described above, the ink is circulated along the small circulation route 11 by taking advantage of a head difference generated between the supply reservoir 22 and the recovery reservoir 23. Desirably, this abnormal time ink circulating step (step S200) is continued until the pressure regulator 50 or 60 is repaired by a repair worker, for example. In a period from when abnormality is detected at the pressure regulator 50 or 60 to when the repair is finished, ejection of the ink from the head 21 may be continued. This allows drying of the nozzle to be suppressed more reliably. In the period described above, the ink may not have to be ejected from the head 21. This allows the shape of a meniscus to be retained more reliably.

Figure 10:
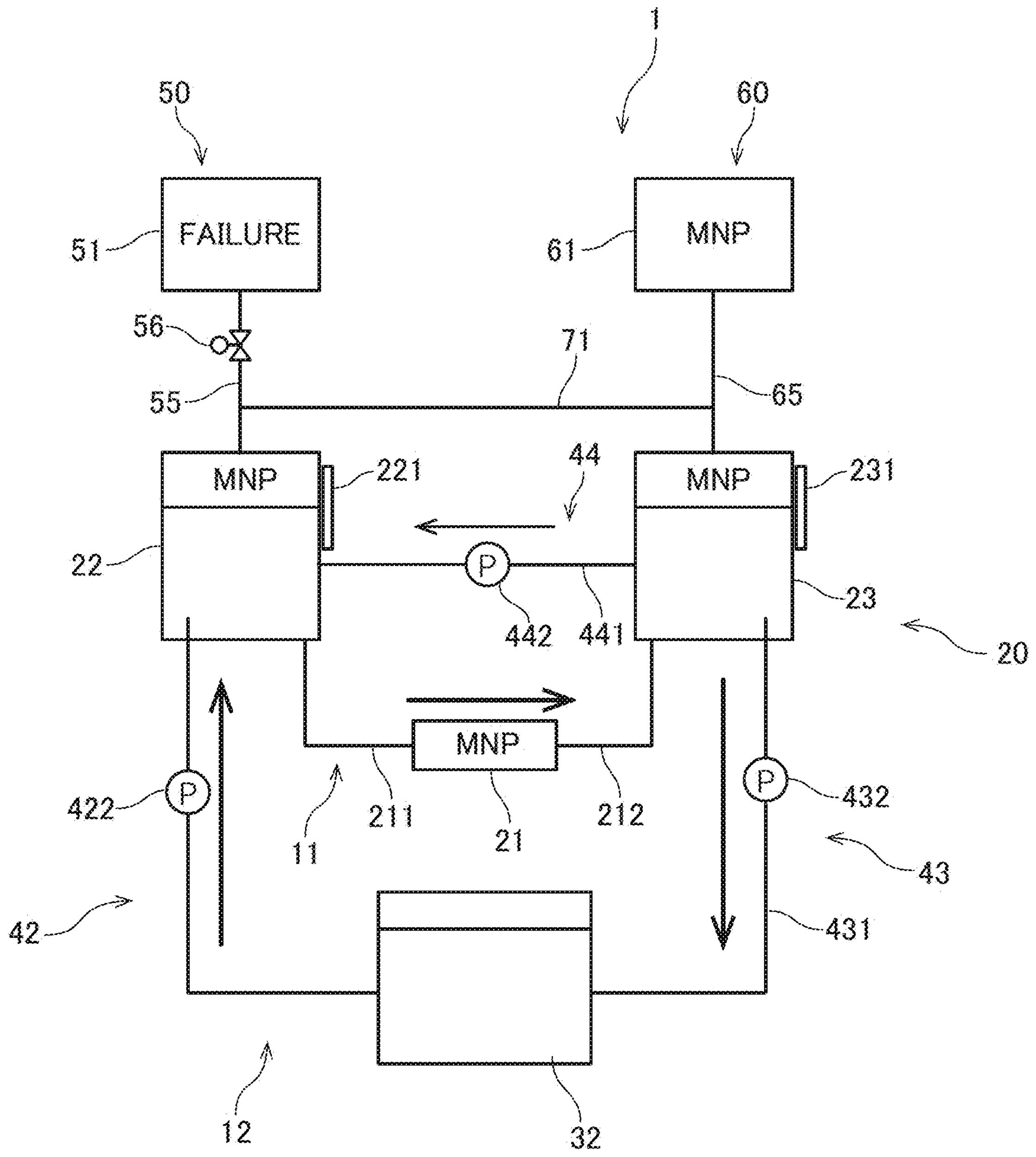
FIG. 10 is a simplified view showing a flow of the ink along the small circulation route and the large circulation route in the abnormal time ink circulating step using the small circulation route and the large circulation route.

FIG. 10 is a simplified view showing a flow of the ink in the abnormal time ink circulating step using the small circulation route 11 and the large circulation route 12. In this method, the controller 90 operates the supply pump 422 and the recovery pump 432 at the same feed amount or feed amounts approximate to each other, and operates the inter-reservoir pump 442 at a feed amount smaller than those of the supply pump 422 and the recovery pump 432.

By doing so, a flow of the ink is generated in the head 21 by which the ink flows from the supply reservoir 22 toward the recovery reservoir 23, as shown in FIG. 10. In this method, the ink is supplied from the buffer tank 332 to the supply reservoir 22 using the supply pump 422, and the ink is supplied from the recovery reservoir 23 to the supply reservoir 22 using the inter-reservoir pump 442.

By employing this method, a flow of the ink is generated in the head 21 using the large circulation route 12, making it possible to increase the flow rate of the ink in the head 21. Thus, even if the head unit 20 has a large number of the heads 21 to cause a large flow path resistance at the plurality of heads 21, it is still possible to generate a flow of the ink reliably in each of the heads 21. As a result, while a back pressure is ensured for the nozzle to reduce the occurrence of leakage of the ink from the nozzle, it is possible to suppress agglomeration of the ink in the head 21 by generating a flow of the ink in the head 21.

<4. Modifications>

While the preferred embodiment of the present invention has been described above, the present invention is not limited to the above-described embodiment.

The ink used in the above-described preferred embodiment is ink of a watercolor pigment type. However, the present invention is not limited to this. The ink may be oil-based ink or dye-based ink.

In the above-described preferred embodiment, the printing apparatus 9 includes the coating processor 92 and the drying processor 94. However, the present invention is not limited to this. The ink supplier of the present invention may be used in a printing apparatus to perform only the printing process.

In the above-described preferred embodiment, the first valve 56, the second valve 66, the bypass valve 72, the supply valve 425, and the recovery valve 433 are solenoid valves. However, these valves are not always required to be solenoid valves. Electric-operated valves may be used as these valves, for example.

The components appearing in the above-described embodiment and modifications may be combined together, as appropriate, without inconsistencies.

While the invention has been shown and described in detail, the foregoing description is in all aspects illustrative and not restrictive. It is therefore understood that numerous modifications and variations can be devised without departing from the scope of the invention.

What is claimed is:

1. An ink supplier that supplies ink to a head in an ink-jet printing apparatus, comprising:
- a supply reservoir storing said ink to be supplied to said head;
- a recovery reservoir storing said ink recovered from said head;
- an inter-reservoir ink flow path for feeding said ink from said recovery reservoir to said supply reservoir;
- a first pressure regulator that supplies a negative pressure to said supply reservoir;
- a first communication pipe forming communication between said first pressure regulator and an air layer in said supply reservoir;
- a first valve interposed in said first communication pipe;
- a second pressure regulator that supplies a negative pressure to said recovery reservoir;
- a second communication pipe forming communication between said second pressure regulator and an air layer in said recovery reservoir;
- a second valve interposed in said second communication pipe;
- a bypass pipe forming communication between the air layer in said supply reservoir and the air layer in said recovery reservoir;
- a bypass valve interposed in said bypass pipe;
- a detector that detects abnormality at said first pressure regulator and said second pressure regulator; and a controller that controls operations of said first pressure regulator, said first valve, said second pressure regulator, said second valve, and said bypass valve, wherein in an ordinary operating state, said controller opens said first valve and said second valve and closes said bypass valve, said controller causes said first pressure regulator to supply a first negative pressure to said supply reservoir, and said controller causes said second pressure regulator to supply a second negative pressure stronger than said first negative pressure to said recovery reservoir, and wherein if said detector detects abnormality at one of said first pressure regulator and said second pressure regulator, said controller performs the steps of:

a) closing a valve being one of said first valve and said second valve and corresponding to one of the pressure regulators where the abnormality has been detected by said detector;

b) opening said bypass valve after said step a);

c) regulating a negative pressure supplied from the other of said first pressure regulator and said second pressure regulator where said detector has not detected abnormality to a third negative pressure stronger than said first negative pressure and weaker than said second negative pressure, said step c) being performed after said step a); and d) generating a flow of said ink by which said ink flows from said supply reservoir toward said recovery reservoir via a plurality of said heads while maintaining the negative pressure supplied from said other pressure regulator at said third negative pressure, said step d) being performed after said step c).

2. The ink supplier according to claim 1, further comprising:

an inter-reservoir pump interposed in said inter-reservoir ink flow path and used for feeding said ink from said recovery reservoir toward said supply reservoir, wherein said step d) performed by said controller includes the steps of:

d1) driving said inter-reservoir pump to feed said ink from said recovery reservoir to said supply reservoir via said inter-reservoir ink flow path so as to make a liquid surface of said ink in said supply reservoir become higher than a liquid surface of said ink in said recovery reservoir; and d2) stopping said inter-reservoir pump and going into standby waiting for said ink to move from said supply reservoir to said recovery reservoir via said plurality of heads as a result of a head difference to reduce a difference in liquid surface height between said supply reservoir and said recovery reservoir, said step d2) being performed after said step d1).

3. The ink supplier according to claim 1, further comprising:

a tank storing said ink to be supplied to said supply reservoir;

an ink supply path forming communication between said tank and said supply reservoir;

a supply pump interposed in said ink supply path and used for feeding said ink from said tank toward said supply reservoir;

an ink recovery path forming communication between said recovery reservoir and said tank;

a recovery pump interposed in said ink recovery path and used for feeding said ink from said recovery reservoir toward said tank; and an inter-reservoir pump interposed in said inter-reservoir ink flow path and used for feeding said ink from said recovery reservoir toward said supply reservoir, wherein in said step d), said controller operates said supply pump and said recovery pump at the same feed amount or feed amounts approximate to each other, and operates said inter-reservoir pump at a feed amount smaller than those of said supply pump and said recovery pump.

* * * * *